3,256,205
CATALYST REJUVENATING PROCESS
George Constabaris, Berkeley, and Jack W. Unverferth, Walnut Creek, Calif., assignors to Chevron Research Company, a corporation of Delaware
No Drawing. Filed July 1, 1963, Ser. No. 292,080
5 Claims. (Cl. 252—413)

The present invention relates to catalytic conversion processes and to the rejuvenation of catalysts which have become deactivated to a difficulty regenerable condition after long exposure to hydrogenative conversion conditions. More especially, the invention relates to a catalytic hydrocracking process for converting petroleum distillates and residua to various valuable products for sustained periods of on-stream operation and relates more particularly to the rejuvenation of hydrocracking catalysts which after long exposure to hydrocarbon feed under hydrocracking conditions have become deactivated and so changed that conventional removal of the accumulated carbonaceous deposits does not regain an appreciable percentage of the original hydrocracking activity.

Although catalytic hydrocracking is recognized as one of the most useful processes available to modern petroleum refiners and in its preferred form can be operated for long on-stream periods under reasonable conditions, the economic attractiveness of the process could be further improved by a procedure for satisfactory regeneration of the hydrocracking catalysts after they have become deactivated by long on-stream periods of operation.

While many literature references assert that deactivated hydrocracking catalysts can be regenerated by combustion of the carbonaceous deposits with or without subsequent treatments, such methods are usually found to restore only a few percent of the fresh catalyst activity than has been lost during long on-stream periods of operation under hydrocracking conditions. For example, if such a catalyst has its activity reduced to 25% of its original activity by long hydrocracking use, a regeneration purporting to double the activity of the deactivating spent catalyst in reality produces a catalyst having only 50% of the fresh catalyst activity. Thus, the prior art has failed to solve the problem of restoring catalyst activity to those catalysts which can be and are operated in a hydrocracking process for long on-stream periods at reasonable operating conditions without intolerable catalyst fouling rates. As shown in Scott Patent 2,944,006, hydrocracking processes to convert hydrocarbon feed to valuable products can be carried out for long on-stream periods at reasonable operating conditions without intolerable catalyst fouling rates with a sulfide of nickel or cobalt disposed on an active siliceous cracking catalyst support, provided the hydrocarbon feed brought into contact with such catalyst has a low nitrogen content. However, it has been found that such catalysts after such long exposure to hydrocarbon feed under hydrocracking conditions becomes deactivated with the metal component so changed that conventional removal of the accumulated carbonaceous deposits does not result in the catalyst regaining an appreciable or adequate percentage of its original hydrocracking activity. During the long exposure to hydrocracking and other hydrogenative conversion conditions, such catalysts undergo a change which appears to be related, at least in part, to a crystallite growth phenomenon of the hydrogenating metal component. This crystallite growth phenomenon either brings about or is related to the inability of the catalyst to be regenerated by conventional regeneration procedures to an adequate proportion of its fresh catalyst activity. While it is not our purpose to set forth in detail any theory to explain the mechanism of catalyst deactivation and the difficulty of regeneration based on a metal crystallite growth phenomenon, it will suffice to point out that in accordance with the present invention, such deactivated catalysts can now be restored substantially to their fresh activity.

In the regeneration procedure of the present invention, the deactivated catalyst is treated in a sequence of steps with careful attention to certain limiting factors. The manner of treating the catalyst to restore its original activity is unobvious, particularly in that the combination of steps and conditions together with the successful results obtained are contrary to what would be expected from the prior art.

Briefly, in the process of the present invention, a series of treating steps in sequence are applied to a supporting hydrogenating catalyst which before long exposure to hydrocarbon feed under hydrogenative conversion conditions is an active catalyst composed of at least one hydrogenating metal component selected from Group VIII metals and compounds thereof, exclusive of noble metals and compounds thereof, disposed on a high surface area support susceptible to attack by strong acids, but which catalyst after long exposure to hydrocarbon feed under hydrogenative conversion conditions has accumulated carbonaceous deposits and has become deactivated with the metal component so changed that conventional removal of the accumulated carbonaceous deposits does not result in recovery of a substantial percentage of the original hydrogenative conversion activity. In this process, the deactivated catalyst is contacted before removal of the carbonaceous deposits with an aqueous solution of strong acid capable of forming with said hydrogenating metal component salts which are decomposable preferably below 1000° F., the aqueous acid solution containing no more acid than is stoichiometrically necessary to form salts with the hydrogenating metal present in the deactivated catalyst and the volume of said solution being no more than fills the pores of the catalyst being rejuvenated. During the contact with the acid solution, the hydrogenating metal component, particularly that portion in the form of large, relatively inactive crystallites, is converted substantially completely to soluble metal salts of the acid, which salts become redistributed on the catalyst support. Thereafter the acid treated catalyst is heated to decompose the salts and remove the carbonaceous deposits, the heat treatment preferably being conducted in an atmosphere such that the salts of the hydrogenating metal are converted to the oxide form. The resulting catalyst composition is then in a condition for use in the similar manner to a freshly prepared catalyst having the hydrogenating metal component in the oxide form.

We have found that the hereindescribed process gives a rejuvenated catalyst having a substantial percentage of the original hydrogenative conversion activity and showing very little loss in surface area of the support. The lack of extensive loss in surface area is surprising since it would be expected that there would be a considerable reaction between the acid and the normally acid-sensitive support.

A particular discovery made in connection with the present invention is that in a deactivated catalyst, the carbonaceous deposits thereon appear to cover or to protect the support but leave exposed for reaction with the acid the hydrogenating metal component, particularly that portion of the metal component which is in the form of the larger, relatively inactive crystallites. Thus, the acid solution readily reacts with the hydrogenating metal component but does not appreciably attack the normally acid-sensitive catalyst support. The high surface area of the catalyst support is thereby retained. The formation of the hydrogenating metal salts and their decomposition along with the oxidation of the carbonaceous deposits brings about a redistribution of the hydrogenating metal component into a finely divided form which is much more catalytically active than the large crystallites in the deactivated catalyst. Not only do the carbonaceous deposits protect the acid-sensitive support during the acid treatment, but the oxidation of these deposits in conjunction with the decomposition and oxidation of the salts of the hydrogenating metal appears to aid in converting the hydrogenating metal component to a highly active form. It will be noted that the amount and volume of acid used is limited and that the acidization products are not removed or washed from the catalyst.

The invention has particular and preferred application to thermactivated hydrocracking catalyst which has become deactivated during long exposure to hydrocarbon feed under hydrocracking conditions. When a hydrocracking catalyst composed of an active siliceous cracking support having disposed thereon nickel, cobalt or the oxides or sulfides thereof as a hydrogenating component is first prepared, it can be converted to an unusually active form by subjecting the catalyst with the cobalt or nickel present therein in the form of oxides or of compounds decomposed thereto on heating, to a controlled heating or thermactivation as disclosed in copending application Serial No. 794,109, filed February 18, 1959, now abandoned. In such thermactivation, a relatively dry, nonreducing gas such as air, nitrogen or $CO_2$ is passed through the mass of particulate catalyst undergoing treatment at a rate which is preferably at least 10 cubic feet per hour per cubic feet of catalyst at temperatures ranging from about 1200–1600° F. for times ranging from about 0.25 to 48 hours sufficient to give a substantial increase in activity, with the lower temperatures in the stated range being used with the longer times and vice versa. Such a thermactivated hydrocracking catalyst normally loses the increased activity obtained by the thermactivation if the catalyst is subjected to an aqueous treatment, even though the catalyst thereafter is promptly dried.

Surprisingly, thermactivated hydrocracking catalyst which has become deactivated during use can be rejuvenated to substantially the original thermactivated activity by the particular sequence of treating steps including the aqueous acid treatment of the present invention but without repeating the thermactivation. This is indeed an unexpected result since thermactivated catalyst as freshly prepared before contact with hydrocarbons loses its thermactivation activity by any aqueous treatment. Also, a deactivated catalyst which is oxidized to remove the carbonaceous deposits and is then treated with aqueous acid to convert the hydrogenating metal components to salts which in turn are subsequently decomposed, does not regain the original thermactivated activity without repeating the thermactivation treatment. Since the high temperature needed for thermactivation is difficult to attain in the vessels usually available in a petroleum refinery, it is highly advantageous to be able to avoid a thermactivation treatment in any catalyst rejuvenation process.

A particular feature of the present invention is that the restored catalyst activity is not a temporary recovery of activity as often occurs in catalyst regeneration procedures heretofore proposed. For example, if a deactivated catalyst upon regeneration regained activity approaching its original activity but only retained such activity for a few hours, the regeneration would not be worthwhile in a hydrocracking process which has as a primary advantage the ability to operate for long on-stream periods at reasonable operating conditions without intolerable catalyst fouling rates.

These and other advantages of the present invention will be apparent from the following more detailed description taken in connection with the examples. As stated, the first step in the process is the contact of the deactivated catalyst having carbonaceous deposits thereon with an acid solution. Suitable acids are the strong acids (dissociation constants $K_a$ preferably above $10^{-2}$) such as nitric acid, sulfuric acid, hydrochloric acid and other strong inorganic and organic acids which form soluble hydrogenating metal salts decomposable at reasonable temperatures. Nitric acid is the most preferred for obtaining the highest activity and the best catalyst life characteristics. When the deactivated catalyst is a hydrocracking catalyst containing nickel or cobalt hydrogenating metal component which was initially thermactivated before use in the hydrocracking process, it is preferred not to use sulfuric acid in the acid treatment of the deactivated catalyst since the sulfates of nickel and cobalt are not readily decomposed and converted in an oxidizing atmosphere below 1000° F. to the oxides.

The volume of acid solution is sufficient to wet the surface of the deactivated catalyst and is less than the volume (on a "coked" catalyst basis) of the pores (i.e., pore volume) of the catalyst being treated. The ratio of the volume of acid solution to the pore volume of the catalyst usually ranges from 0.5 to 0.9 but to avoid removing hydrogenating metal with excess acid solution, the ratio is not more than 1.0. Also, the amount of acid which governs the concentration in view of the limit on the volume of the acid solution is not more than stoichiometrically necessary to convert all the hydrogenating metal component present to the corresponding salts. The amount of acid is 0.5 to 1.0 of the stoichiometric amount of hydrogenating metal present, the higher amounts from 0.8 to 1.0 which redistribute a greater proportion of the inactive metal crystallites being preferred. Care should be taken in the acid treating step to get a uniform distribution of the acid solution throughout the mass of catalyst so that the reaction is substantially uniform. Such uniformity of dispersion of the acid solution can be brought about by suitable agitation of the acid solution and catalyst particles. Where the catalyst particles are in fixed beds not suitable for agitation, the catalyst solution can be injected as a spray at a number of points along with jet streams of air to sweep any excess acid solution off the surface of individual catalyst particles. The streams of air passing through stationary beds of catalyst during the exothermic acid reaction will also tend to decrease the temperature, and it is usually desirable to keep the temperature of the catalyst during the acid treatment down in the neighborhood of room temperature.

After the hydrogenating metal has been converted substantially completely to the salts of the treating acid, the treated catalyst is dried without removing any appreciable amount of the treating agent since to do so would lose part of the hydrogenating metal component. Then the carbonaceous deposits are burned off and the metal salts decomposed and converted to the coorresponding oxides. For this purpose, a dry combustion supporting gas such as a nitrogen-air mixture is used. Other oxygen containing mixtures such as air plus carbon dioxide or other inert gas may be used. Preferably, at least during the initial portion of the burn, the catalyst temperature is controlled below 750° F., usually above 450° F. at the start. This temperature control is accomplished by using dilute oxygen containing gas such as ¼–½ percent oxygen in admixture with inert gas at the start of treatment and gradually raising the oxygen content. Such heat treatment in an oxidizing atmosphere is continued until burning substantially ceases and the salts have been substantially completely decomposed and converted to the oxides. When the catalyst is in one or more fixed beds, the catalyst is contacted with dry combustion supporting gas at below 750° F. until an initial burning wave has passed through the catalyst beds. Usually, some carbonaceous material still remains on the catalyst and some of the hydrogenating metal component is not completely converted to the oxide. Thereafter, the catalyst is contacted further with the dry combustion supporting gas at a maximum catalyst temperature of at least 50° higher than used in the first burn, but at a temperature controlled below 850° F. until the second burning wave passes through the catalyst beds. Usually, a final burn with the oxygen concentration increased and the temperature of the dry combustion supporting gas increased up to 950° to 1000° F. is carried out until no further burning is observed. Preferably, the oxidations are carried out with an elevated pressure of above 200 p.s.i.g., such as above 500 p.s.i.g. up to 10,000 p.s.i.g. using a circulating inert gas to which is added .1 to 4 mol percent of oxygen during the initial portion of the oxidation and in which the oxygen content is gradually increased. In any event, the temperature is kept below that at which there is an appreciable loss of the surface area of the catalyst.

The dry combustion supporting gas is preferably free of sulfur oxides and may be any suitable mixture of oxygen with an inert carrier gas. Examples are nitrogen-air flue gas air mixtures. Where the gas is recycled, it is preferred to remove combustion products such as CO, $SO_2$ and $H_2O$ to prevent their build up in the circulating gas. For this purpose the gas may be scrubbed with a caustic solution or may be subjected to catalytic or adsorptive contacting.

By "dry" combustion supporting gas is meant that the molar concentration of water vapor is relatively low, that is, at least below about 6 mol percent and preferably below 1 mol percent.

Following the oxidation step, the catalyst may be variously treated prior to use or can be used directly in hydrogenative conversion operations. Such treatments can include thermactivation, reduction and sulfiding. Where the catalyst is to be placed in a hydrocracking operation, the catalyst can be used without further treatment, particularly with sulfur-containing feeds which would sulfide the catalyst during start up to the desired sulfide state for the hydrogenating metal component such as nickel.

The preferred final step in preparing the catalyst for reuse in hydrocracking operations is to convert the hydrogenating metal component to the sulfide. This may be accomplished in any of the several known ways such as by contacting the catalyst with a sulfiding agent such as $H_2S$, mixtures of hydrogen and $H_2S$ and mixtures of hydrogen and organic sulfur compounds reducible to $H_2S$ at the conditions employed. Generally, the catalyst temperature during sulfiding is controlled below 850° F. and preferably below 750° F. The best results are obtained by contacting the oxidized catalyst with a mixture of hydrogen and vaporized organic sulfur compounds such as dimethyl disulfide, isopropyl mercaptan or carobn disulfide at temperatures in the range of 450–650° F. An excess of sulfiding agent is usually employed to insure substantially complete conversion of the oxide of the hydrogenating metal component to the sulfide.

By the above-described procedure, deactivated hydrogenative conversion catalysts can be rejuvenated to substantially original, fresh activity or so closely approaching such activity that the over-all useful life of the catalyst is greatly extended. When applied to the preferred hydrocracking catalysts, particularly to such catalysts with nickel or cobalt hydrogenating metal components, the economic application of the hydrocracking is greatly expanded. Hence the rejuvenation procedure is especially desirable to use as part of a hydrocracking process. In such process, hydrocarbon stocks including hydrocarbon distillates boiling from about 300° to 1100° F., hydrocarbon residuals boiling above about 1050° F., and mixtures thereof are hydrocracked to more valuable lower boiling products by contacting such feeds in a hydrocracking zone with a catalyst comprising the hydrogenating-dehydrogenating component on an active, acid, cracking support at a temperature from 450° to 900° F., preferably for a major portion of the on-stream period below 750° F., a space velocity of from about 0.2 to 5.0 or more, and a hydrogen partial pressure of at least 350 p.s.i.g. with at least 1000 s.c.f. of hydrogen per barrel of feed, there being consumed in the hydrocracking zone at least 500 s.c.f. of hydrogen per barrel of feed converted to products boiling below the initial boiling point of said feed. While nickel sulfide is preferred as the hydrogenating-dehydrogenating component in such hydrocracking conversions, other hydrogenating components are the compounds of metals of Groups VI and VIII of the Periodic Table, exclusive of the noble metals. Combinations of preferred metal sulfides with one or more metals and compounds thereof from Groups VIII, VI–B and I–B of the Periodic Table may be used. The amount of the hydrogenating component may be varied from 0.5 to 35% or more, more desirably in the range of 4 to 20%, based on the weight of the entire catalyst composition. The remaining, or cracking, component of the hydrocracking catalyst may be selected from the various siliceous cracking catalysts, such as the composites of silica-alumina, silica-magnesia, silica-alumina-zirconia, silica-zirconia-titania and synthetic metal aluminum silicates (including synthetic chabazites normally referred to as "molecular sieves") which have been found to impart the necessary degree of cracking activity to the catalyst. In this connection the term "high cracking activity" is employed herein to designate those catalysts having activity equivalent to a Cat. A value of at least 25 or a quinoline number of at least 20 (Jr. Am. Chem. Society, 72, 1554 (1950)). These cracking components or supports for the hydrogenating metal component are normally readily attacked by strong aqueous acid. Particularly preferred catalyst components are synthetically prepared silica-alumina compositions having a silica content in the range of from about 15 to 99% by weight and an alumina content of 1 to 85% by weight. The hydrocracking conversion is normally preceded by a treatment to remove excess nitrogen content from the hydrocarbon charging stocks. Preferably, this is accomplished by a hydrodenitrification process comprising contacting said feed with hydrogen in a suitable catalyst under hydrofining conditions, such as a space velocity of 0.2 to 10 LHSV, a pressure of 500–5000 p.s.i.g. and a temperature of 500–850° F.

The activities of catalysts can be compared in terms of their ability to convert a feed stock to lower boiling products. One way to make such comparison is to determine the amount of conversion at standard conditions of a feed stock such as n-decane in the presence of the catalyst to be compared. By determining the relative conversion under the same operating conditions for fresh and treated catalysts, the activity of a rejuvenated catalyst can be compared to that of fresh catalyst.

Another method for determining relative activities is to carry out comparative hydrocracking tests with a selected standard and readily obtainable hydrocarbon feed stock operating at selected standard conditions to obtain a constant conversion by varying the temperature. Such tests are run for a period adequate to determine the fouling rate, i.e., the rate at which the temperature has to be raised to maintain the conversion constant. Usually the tests run for 250–350 hours. The starting temperatures, determined by extrapolating back to zero time after the unit has run for sufficient time to attain steady operation, serve as a basis for comparing the catalyst activities. The lower the starting temperature the longer the catalyst can be used at constant conversion before the temperature needs to be raised above the point where the selectivity and nature of the products changes substantially. Usually this temperature at which the run is terminated is about 700° F. when using the preferred catalysts and process of Scott Patent 2,944,006. Also, from the starting temperatures and correlations between conversions and activities in terms of starting temperatures, the rate constants can be corrected to the same temperature. Such rate constants can be used to compare catalysts. The feed stock employed in this test, sometimes identified as the "fouling rate test," is a catalytic cycle oil obtained as a distillate fraction from a fluid type catalytic cracking unit, the fraction being one containing essentially equal proportions of aromatics and of paraffins plus naphthenes, which distillate is hydrofined to produce a stock having the following inspections:

| | |
|---|---:|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |
| ASTM distillation (D–158): | |
| Start | 362 |
| 5% | 441 |
| 10% | 453 |
| 30% | 481 |
| 50% | 500 |
| 70% | 523 |
| 90% | 560 |
| 95% | 577 |
| End point | 624 |

The equipment employed in determining the fouling rate of the catalyst is a conventional continuous feed pilot unit, operated once-through with hydrocarbon feed and hydrogen gas. It consists of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high pressure separator provided with means for sampling the gas and liquid phases, back pressure regulators, and thermocouples.

In the fouling rate test, the foregoing hydrofined cycle oil test stock is passed through the test catalyst at a liquid hourly space velocity of 1.5, 1200 p.s.i., a once-through hydrogen rate of 6500 s.c.f. per barrel of feed and a constant conversion maintained by adjusting the temperature. The hydrogen consumption is about 900 s.c.f. of hydrogen per barrel.

In the following more detailed description, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 1000 hours.

To illustrate the process of the present invention, tests were carried out on catalyst which were prepared by the procedure of the following example.

EXAMPLE 1

A catalyst containing nickel sulfide on silica-alumina was prepared by impregnating silica-alumina particles with a solution of nickel nitrate in a concentration sufficent to provide the catalyst with 6 weight percent nickel on a dry basis. The silica-alumina particles contained about 90% silica and had a Cat. A value in excess of 40 before being impregnated with the hydrogenating metal component. After impregnation and drying, the catalyst was thermactivated by contact for 2.2 hours with a stream of hot air at an average temperature of about 1425° F. Thereafter, the catalyst was sulfided and used for hydrocracking in a multibed reactor for several thousand hours on a hydrocarbon feed stock having a total nitrogen conent of less than 1 p.p.m. The hydrocracking operation was discontinued when the temperature necessary to maintain hydrocracking conversion of the hydrocarbons at 60% had risen to approximately 750° F. An analysis of the catalyst at this stage showed that it had metal crystallite sizes of the order of 500 to 2000+A., with the larger particles in the first bed. Air blowing the spent catalyst by convention procedures to remove the carbonaceous deposits produces catalysts having only about 20–40% of fresh catalyst activity. Particularly poor results are obtained with the catalysts having the larger size metal crystallites.

EXAMPLE 2

In a series of tests the relative activities of catalysts subjected to different treatments were compared by measuring their effectiveness for cracking n-decane. In this series, Catalyst A was a fresh catalyst prepared from the silica-alumina particles used in Example 1 by impregnation with a 2.5 molar nickel nitrate solution to dispose on the silica-alumina about 6 weight percent of nickel. The catalyst was then dried at about 600° F. Catalyst B was a spent catalyst as described in Example 1 after it had been regenerated by stepwise oxidation in dry air at 800° F. for 2 hours and at 1000° F. for 2 hours. Catalyst C was the same as Catalyst B with the subsequent treatment with enough 2.5 molar nitric acid (equivalent to one-half the nickel metal present) to fill the pores of the catalyst. Catalyst D was the spent catalyst from Example 1 which was treated without first removing the carbonaceous deposits thereon with enough 2.5 molar nitric acid to fill the pores of the catalyst. Each of Catalysts A, B, C and D was thermactivated for about 2 hours at 1400° F. in dry air, although this is not preferred. Then the catalysts were sulfided at 600° F. with hydrogen sulfide and used to hydrocrack n-decane in a continuous flow fixed bed, high pressure microcatalytic reactor. In such test 3 ml. of catalyst is supported inside of a 0.79 cm. I.D. stainless steel tube surrounded by a heavy walled steel block inside an electrically heated oven. Catalyst temperatures are measured by a Chromel Alumel thermocouple located on the reactor wall at the central portion of the catalyst bed. Said rates are measured by a micro-feeder pump, and the hydrogen rate is measured by a wet test meter. Liquid and gaseous products are analyzed by gas chromatography. In the tests of each of the catalysts, the following conditions are observed. n-Decane is fed at a liquid hourly space velocity of 16.0 along with hydrogen at a hydrogen/decane mol ratio of 10 and brought into contact with the catalyst at a temperature of 550° F. and a total pressure of about 1200 p.s.i.a. The surface areas were measured by the nitrogen adsorption method of Brunauer, Emmett and Teller as described in Jr. Am. Chem. Soc., 60, 309 (1938).

The results of the tests on the above catalyst are shown in the following table:

Table I

| Catalyst | Treatment | Conversion (Mol, percent) | Rate (Mols per ml. hr.) $\times 10^2$ | $N_2$ Area m.$^2$/g. |
|---|---|---|---|---|
| A—Freshly Prepared | Thermactivated | 29.4 | 2.37 | 290 |
| B—Spent Catalyst | Oxidized and thermactivated. | 18.2 | 1.5 | 300 |
| C—Spent Catalyst | Oxidized, thermactivated and acid treated. | 18.5 | 1.5 | 232 |
| D—Spent Catalyst | Acid treated, Oxidized and thermactivated. | 25.0 | 2.0 | 277 |

The above tests illustrate that contacting spent catalyst before removal of the carbonaceous deposits with strong acid such as nitric acid in accordance with the present invention brings about a rejuvenation of the spent catalyst to an activity very close to the fresh catalyst level (compare the conversions with Catalyst A and Catalyst D). It is also observed that if the carbonaceous deposits are removed prior to the acid treatment, there is a large loss in activity and surface area of the catalyst.

EXAMPLE 3

To determine the effect of acid concentration and calcination temperature in the present process, tests were carried out on samples of spent catalysts as described in Example 1 above and taken from several different beds in a multibed recator. Coked catalyst from each bed was treated with a pore volume of nitric acid at two different concentrations. The treated catalysts were then heated at the indicated temperatures in dry flowing air, after which the surface area was measured by nitrogen absorption. The results of these tests together with some properties of the coked catalyst are given in the following table:

Table II

| Catalyst | Untreated (Coked) | | | | HNO$_3$ Treated | | | |
|---|---|---|---|---|---|---|---|---|
| | Percent, C | Percent, Ni | $N_2$, Area | Pore Vol., cc./g. | HNO$_3$ Conc., m./l. | $N_2$ Surface Area (m.$^2$/g.) After Heating 2 Hrs. at— | | |
| | | | | | | 600° F. | 800° F. | 1,400 °F. |
| First Bed | 10.56 | 5.6 | 169 | 0.26 | 7.8 | 248 | 310 | 283 |
| | | | | | 2.5 | 236 | 328 | 272 |
| Second Bed | 6.4 | 6.3 | 233 | 0.38 | 5.0 | 272 | 312 | 283 |
| | | | | | 2.5 | 285 | 328 | 272 |
| Third Bed | 5.8 | 5.9 | 232 | 0.38 | 5.0 | 264 | 330 | 278 |
| | | | | | 2.5 | 256 | 308 | 276 |
| Fourth Bed | 1.6 | 6.3 | | 0.41 | 5.0 | 310 | 324 | 276 |
| | | | | | 2.5 | 299 | 310 | 264 |

In the above tests the higher acid concentration in each case is that required to just fill the pore volume and to react with all the nickel present. If greater than a pore volume of acid solution has been used, the solution would drain from the catalyst carrying with it nickel in solution, resulting in a loss of nickel.

The above data illustrate that the area of the nitric acid treated catalyst goes through a maximum in the preferred final heating temperature range of about 700–1000° F.

Comparing the areas of the acid treated catalysts with the 310 m.$^2$/g. area for freshly prepared catalyst, it will be seen that particularly with the preferred final heating temperature, the surface area is substantially retained and in some cases slightly increased.

EXAMPLE 4

The rejuvenated catalysts which had been treated at the high acid level and calcined at 1400° F., as set forth in Example 3, where tested for hydrocracking activity with a n-decane feed in accordance with the procedure described in Example 2. An analysis of the products obtained showed substantially the same product distribution, the iso/normal ratios in the products all being high (5.2 to 6.0), and hence, the selectivity and the nature of the reaction was about the same. The conversions obtained were compared to that obtained under the same conditions with a freshly prepared catalyst, the relative activities in the following table being based upon conversions of n-decane.

Table III

| Catalyst bed: | Relative activity of rejuvenated catalyst, percent |
|---|---|
| First bed | 100 |
| Second bed | 110 |
| Third bed | 93 |
| Fourth bed | 101 |

These results are indicative of the effectiveness of the rejuvenation procedure in recovering the activity of spent catalyst. The activity of spent catalyst from the first bed before the above regeneration was 40.5% of fresh catalyst activity.

EXAMPLE 5

A series of tests were carried out as described hereinabove in the fouling rate test procedure. A catalyst freshly prepared in accordance with Example 1 has an activity in terms of starting temperature of about 575° F. and a fouling rate of 0.12° F. per hour. A spent catalyst taken from the third bed and rejuvenated with the higher acid concentration as described in Example 3 followed by stepwise oxidation, had a starting temperature of about 582° F. and a fouling rate of 0.14° F. It will be noted that both the starting temperature (i.e., activity) and the fouling rate were about the same as for fresh catalyst. The same spent catalyst regenerated by a careful stepwise oxidation treatment (starting with a nitrogen-air mixture containing ½% oxygen at 600° F. and gradually raising the temperature and oxygen content to all air and a temperature of 1000° F. for a total period of about 50 hours) had a starting temperature of about 620° F. and a fouling rate of 0.25° F. per hour. The catalyst regenerated by oxidation alone had an activity of 28% of fresh catalyst activity as determined by rate constants obtained by correction to the same operating temperature.

These results illustrate that the present acid treating procedure results in rejuvenated catalysts not only with an activity near that of fresh catalyst but with a fouling rate about the same as fresh catalyst. Hence, the catalyst is rejuvenated by this procedure with a high activity that lasts for a long time, thereby greatly extending its life and contributing significantly to the economic value of the low temperature hydrocracking process.

It will be noted that the conventional regeneration by an oxidation gives a catalyst which degenerates almost twice as fast as fresh catalyst and has a low activity as indicated by its high starting temperature. Such procedure is not nearly as satisfactory as the acid treating procedure of the present invention.

We claim:

1. A process for rejuvenating a supported hydrogenating catalyst which, before long exposure to hydrocarbon feed under hydrogenative conversion conditions, is an active catalyst composed of at least one hydrogenating metal component selected from the group consisting of Group VIII metals and compounds thereof, other than noble metals and compounds thereof, disposed on a high surface area support susceptible to attack by strong acids, but which catalyst after long exposure to hydrocarbon feed under hydrogenative conversion conditions has accumulated carbonaceous deposits and has become deactivated with the metal hydrogenating component so changed that conventional removal of the accumulated carbonaceous deposits does not result in recovery of a substantial percentage of the original hydrogenative conversion activity, which process comprises contacting said deactivated catalyst before removal of said carbonaceous deposits with an aqueous solution of strong acid having a dissociation constant of greater than $10^{-2}$ and capable of forming salts with said hydrogenating metal component, said aqueous solution containing acid in the range of from 0.5 the stoichiometric amount to no more than is stoichiometrically necessary to form said salts with the hydrogenating metal component present in the deactivated catalyst and the volume of said solution being no more than fills the pores of the catalyst being rejuvenated, continuing the contact between said acid and said deactivated catalyst until said hydrogenating metal component is substantially completely converted to said salts, and thereafter decomposing said salts in the acid-treated catalyst and removing said carbonaceous deposits.

2. The process of claim 1 wherein the amount of acid used is sufficient to convert 80 to 100% of the hydrogenating metal present to its salts.

3. A process of claim 1 wherein the decomposition of the hydrogenating metal salts and the removal of carbonaceous deposits are effected in an oxidizing atmosphere at a temperature in the range of 700–100° F.

4. The process for rejuvenating a supported hydrocracking catalyst which, before long exposure to hydrocarbon feed under hydrocracking conditions, is an active hydrocracking catalyst comprising nickel sulfide as the hydrogenating metal component disposed on a high surface area support susceptible to attack by strong acids and which catalyst before conversion to the sulfide form has been activated by heating in air at 1200–1500° F. for 0.25 to 48 hours, but which catalyst after long exposure to hydrocarbon feed under hydrocracking conditions has accumulated carbonaceous deposits and has become deactivated with the nickel hydrogenating component so changed that conventional removal of the accumulated carbonaceous deposits does not result in recovery of a substantial percentage of the original hydrocracking activity, which process comprises contacting said deactivated catalyst before removal of said carbonaceous deposits with an aqueous solution of strong acid having a dissociation constant of more than $10^{-2}$ and capable of forming salts with said nickel hydrogenating component, said acid solution containing acid in the range of from 0.8 the stoichiometric amount to no more than is stoichiometrically necessary to form said salts with the nickel hydrogenating component present in the deactivated catalyst, and the volume of said solution being no more than fills the pores of the catalyst being rejuvenated, continuing the contact between said and said deactivated catalyst until said nickel hydrogenating component is substantially completely converted to nickel salts of said acid and thereafter simultaneously decomposing said nickel salts in the acid-treated catalyst and removing said carbonaceous deposits under conditions such that the final temperature of treatment is in the range of 700–1000° F.

5. In a process for hydrocracking hydrocarbon stocks at elevated temperatures and pressures with excess hydrogen and a supported hydrocracking catalyst which before long exposure to hydrocarbon feed under hydrocracking conditions is an active catalyst composed of at least one hydrogenating metal component selected from the group consisting of Group VIII metals and compounds thereof, other than the noble metals and compounds thereof disposed on a high surface area cracking support susceptible to attack by strong acids, but which catalyst after long exposure to hydrocarbon feed under hydrocracking conditions has accumulated carbonaceous deposits and has become deactivated with the metal hydrogenating component so changed that conventional removal of the accumulated carbonaceous deposits does not result in recovery of a substantial percentage of the original hydrocracking activity, the improvement which comprises extending the effective on-stream time by rejuvenating said catalyst when it becomes so deactivated by contacting said deactivated catalyst before removal of said carbonaceous deposits with an aqueous solution of strong acid having a dissociation constant of no more than $10^{-2}$ and capable of forming salts with said hydrogenating metal component, said aqueous solution containing acid in the range of from 0.8 the stoichiometric amount to no more than is stoichiometrically necessary to form said salts with the hydrogenating metal component present in the deactivated catalyst and the volume of said solution being no more than fills the pores of the catalyst being rejuvenated, continuing the contact between said acid and said deactivated catalyst until said hydrogenating metal component is substantially completely converted to said salts, and thereafter decomposing said salts in the acid-treated catalyst and removing said carbonaceous deposits.

References Cited by the Examiner

UNITED STATES PATENTS

| 1,022,347 | 4/1912 | Wilbuschewitsch | 252—413 |
| 1,446,984 | 2/1923 | Midgley | 252—415 |
| 1,952,911 | 3/1934 | Rewal | 252—413 |
| 2,367,263 | 1/1945 | Brown | 252—415 |

FOREIGN PATENTS

| 834,361 | 5/1960 | Great Britain. |

OTHER REFERENCES

Berkman et al.: Catalysis, Reinhold Publishing Corporation, New York (1940), page 400.

BENJAMIN HENKIN, *Primary Examiner*.

MAURICE A. BRINDISI, *Examiner*.

R. M. DAVIDSON, *Assistant Examiner*.